US007096361B2

(12) United States Patent
Cuenod et al.

(10) Patent No.: US 7,096,361 B2
(45) Date of Patent: Aug. 22, 2006

(54) METHOD AND SYSTEM FOR LIMITING THE POSSIBILITY OF TRANSFORMING DATA DESIGNED TO CONSTITUTE, IN PARTICULAR PRE-PAYMENT TOKENS

(75) Inventors: Jean-Christophe Cuenod, Degas (FR); Gilles Sgro, Ferry (FR)

(73) Assignee: VALIDY, Romans sur Isere (FR)

( * ) Notice: Subject to any disclaimer, the term of this patent is extended or adjusted under 35 U.S.C. 154(b) by 750 days.

(21) Appl. No.: 10/312,337

(22) PCT Filed: Jul. 4, 2001

(86) PCT No.: PCT/FR01/02143

§ 371 (c)(1),
(2), (4) Date: Dec. 26, 2002

(87) PCT Pub. No.: WO02/03338

PCT Pub. Date: Jan. 10, 2002

(65) Prior Publication Data

US 2004/0032951 A1    Feb. 19, 2004

(30) Foreign Application Priority Data

Jul. 5, 2000    (FR) .................................. 00 08773

(51) Int. Cl.
*G06F 1/26* (2006.01)
(52) U.S. Cl. ........................ 713/168; 713/189; 713/193
(58) Field of Classification Search ................ 713/168, 713/189, 193
See application file for complete search history.

(56) References Cited

FOREIGN PATENT DOCUMENTS

| DE | 197 16 068 A | 10/1998 |
|---|---|---|
| EP | 0 451 057 A | 10/1991 |
| EP | 0 507 669 A | 10/1992 |
| EP | 0 865 010 A | 9/1998 |
| WO | WO 97 30409 A | 8/1997 |
| WO | WO 98 22915 A | 5/1998 |
| WO | WO 98 43211 A | 10/1998 |

*Primary Examiner*—Thomas R. Peeso
(74) *Attorney, Agent, or Firm*—Sughrue Mion, PLLC

(57) ABSTRACT

The subject of the invention concerns a process and a system to limit the possibility to transform data, the transformation of $T_X$-type data into $T_Y$-type data being carried out using an A-type transformation function, while the transformation of $T_Y$-type data into $T_X$-type data is carried out using a B-type transformation function, inverse of the A-type transformation function, the data being in particular designed to constitute for instance pre-payment tokens.

According to the invention, the system includes at least one A-type data processing system ($STD_A$), at least one B-type data processing system ($STD_B$), at least one link, at least once, between the system ($STD_A$) and the system ($STD_B$), at least one A-type processing and memorizing unit ($UTM_A$) including at least the A-type transformation function, at least one B-type processing and memorizing unit ($UTM_B$) including the B-type transformation function and not including the A-type transformation function.

17 Claims, 6 Drawing Sheets

METHOD AND SYSTEM FOR LIMITING THE POSSIBILITY OF TRANSFORMING DATA DESIGNED TO CONSTITUTE, IN PARTICULAR PRE-PAYMENT TOKENS

The subject of the invention concerns the domain of technical means adapted to limit, through at least one processing and memorizing unit, the possibility to transform $T_X$-type data into $T_Y$-type data and the possibility to transform $T_Y$-type data into $T_X$-type data, the transformation of the $T_X$-type data into $T_Y$-type data being carried out using an A-type transformation function, while the transformation of the $T_Y$-type data into $T_X$-type data is carried out using a B-type transformation function, inverse of the A-type transformation function.

The subject of the invention finds a particularly advantageous but non-exclusive application in the domain of generation and use of data designed to constitute pre-payment tokens, such as prepayment cards for instance.

In the state of technology, appears the need, for certain applications, to attribute to at least three categories of persons or users, different transformation capabilities for data. The first user category is able to transform $T_X$-type data into $T_Y$-type data using an A-type transformation function. The second user category is able to transform $T_Y$-type data into $T_X$-type data using the B-type transformation function inverse of the A-type transformation function, but is not able to transform $T_X$-type data into $T_Y$-type data using the A-type transformation function. The third user category is able neither to transform $T_X$-type data into $T_Y$-type data using the A-type transformation function, nor to transform $T_Y$-type data into $T_X$-type data using the B-type transformation function, inverse of the A-type transformation function.

For instance, such a need to distinguish three user categories exists for data designed to constitute pre-payment tokens. Thus, a first user category is able to generate from known initial identifiers corresponding each to a client possessing a resource consumption credit, tamperproof pre-payment token identifiers. A second user category is able to restore, from a prepayment token identifier, the known initial identifier, and therefore the client, with the intention of affecting his resource consumption to him. The third user category is able neither to generate pre-payment token identifiers, nor to determine the client corresponding to a token identifier.

For the implementation of such a process, is known in the previous art, the technique which uses a public keys—private keys encryption system, applied twice. The first user category has a public key #1 and a private key #2. The second user category has a public key #2 and a private key #1.

The first user category is able to transform $T_X$-type data $D_X$ into $T_Y$-type data $D_Y$. To that end, the data $D_X$ is encrypted using the public key #1 to obtain intermediate data which is decrypted using the private key #2 to form data $D_Y$.

The second user category is able to transform the $T_Y$-type data $D_Y$ into $T_X$-type data $D_X$. The data $D_Y$ is encrypted using the public key #2 to obtain intermediate data which is decrypted using the private key #1 to constitute the data $D_X$. However, the second user category is not able to transform the data $D_X$ into data $D_Y$, because it does not have the private key #2.

The third user category is able to transform neither the data $D_X$ into data $D_Y$, nor the data $D_Y$ into data $D_X$.

The implementation of that technique of limitation of the possibility to transform data requires the setting up of a public keys certification infrastructure. Such infrastructure is relatively complex and costly.

The subject of the invention aims at remedying the drawbacks of the previous art by proposing a technique enabling to limit the possibilities of data use for three user categories, by implementing simple and inexpensive means.

So as to reach such a goal, the subject of the invention concerns a process to limit, through at least one processing and memorizing unit, the possibility to transform $T_X$-type data into $T_Y$-type data and the possibility to transform $T_Y$-type data into $T_X$-type data, the transformation of the $T_X$-type data into $T_Y$-type data being carried out using an A-type transformation function, while the transformation of the $T_Y$-type data into $T_X$-type data is carried out using a B-type transformation function, inverse of the A-type transformation function, the data being in particular designed to constitute for instance, pre-payment tokens, and being implemented on at least one data processing system.

According to the invention, the process comprises:

using an A-type data processing system and a B-type data processing system, setting up at least once, at least one link between the A-type data processing system and the B-type data processing system, so as to provide the transfer of at least $T_Y$-type data from the A-type data processing system to the B-type data processing system and/or to provide the transfer of at least $T_X$-type data from the B-type data processing system to the A-type data processing system, during an A-type customization phase, creating at least one A-type processing and memorizing unit including at least the A-type transformation function, during an A-type transformation phase:

for a user possessing at least one A-type processing and memorizing unit, enabling:

to transfer at least one piece of $T_X$-type data from the A-type data processing system to the A-type processing and memorizing unit, to transform in the A-type processing and memorizing unit, each piece of $T_X$-type data into a piece of $T_Y$-type data, using the A-type transformation function, to transfer each piece of $T_Y$-type data from the A-type processing and memorizing unit to the A-type data processing system, for a user not possessing any A-type processing and memorizing unit, not being able to transform a piece of $T_X$-type data into a piece of $T_Y$-type data, using the A-type transformation function, during a B-type customization phase, creating at least one B-type processing and memorizing unit including the B-type transformation function and not including the A-type transformation function, and during a B-type transformation phase:

for a user possessing a B-type processing and memorizing unit, and not possessing an A-type processing and memorizing unit, enabling:

to transfer at least one piece of $T_Y$-type data from the B-type data processing system, to the B-type processing and memorizing unit, to transform in the B-type processing and memorizing unit each piece of $T_Y$-type data into a piece of $T_X$-type data, using the B-type transformation function, to transfer each piece of $T_X$-type data from the B-type processing and memorizing unit to the B-type data processing system, not being able to transform a piece of $T_X$-type data into a piece of $T_Y$-type data using the A-type transformation function.

Various other characteristics emerge from the description made below in reference to the appended diagrams which show, as non-limiting examples, embodiments and implementations of the subject of the invention.

Figure 1:
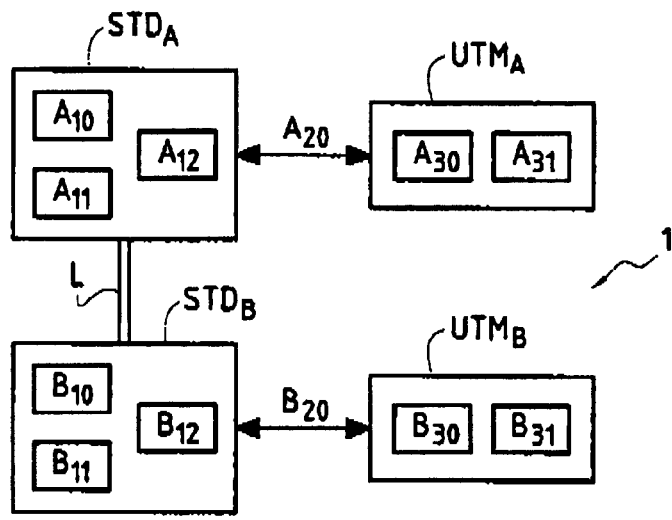
FIG. 1 is a functional block diagram illustrating the technical means enabling the implementation of the invention.

FIG. 1 illustrates an embodiment of a system 1 to limit the possibility of data transformation. The system 1 includes an A-type data processing system $STD_A$. Generally speaking, such an A-type data processing system $STD_A$ includes at least one processor $A_{10}$ enabling the execution of an implementation software $A_{11}$. The A-type data processing system $STD_A$ can be a computer, a server or be part, for instance, of various machines, devices, fixed or mobile products, or vehicles in the general sense. The A-type data processing system $STD_A$ is connected, using transfer means $A_{12}$, by a link $A_{20}$, to an A-type processing and memorizing unit $UTM_A$.

For the sake of simplification in the rest of the description, the A-type data processing system $STD_A$ shall be refereed to as system $STD_A$ and the A-type processing and memorizing unit $UTM_A$ shall be refereed to as unit $UTM_A$.

The link $A_{20}$ between the system $STD_A$ and the unit $UTM_A$ can be realized in any possible way, such as for instance a serial link, a USB bus, a radio link, an optical link, a network link or a direct electric connection to a circuit of the system $STD_A$, etc. It should be observed that the unit $UTM_A$ can possibly be physically located inside the same integrated circuit than the processor of the system $STD_A$. In this case, the unit $UTM_A$ can be considered as a co-processor in relation to the processor of the system $STD_A$ and the link $A_{20}$ is internal to the integrated circuit.

The unit $UTM_A$ includes transfer means $A_{30}$ and processing and memorizing means $A_{31}$. It must be considered that the transfer means $A_{12}$ and $A_{30}$ are of software and/or hardware nature and are capable of providing and optimizing the data communication between the system $STD_A$ and the unit $UTM_A$. Said transfer means $A_{12}$, $A_{30}$ are adapted to enable to have at one's disposal an implementation software $A_{11}$ which is, preferably, independent from the type of link $A_{20}$ used. Said transfer means $A_{12}$, $A_{30}$ are not part of the subject of the invention and are not described more precisely as they are well known by the Man of art.

Said unit $UTM_A$ is able to:
using the transfer means $A_{30}$:
accept data provided by the system $STD_A$,
return data to the system $STD_A$,
using the processing and memorizing means $A_{31}$:
to store data possibly in secret and to retain at least a part of said data even if the unit $UTM_A$ is switched off,
and to carry out algorithmic processing on data, part or all of said processing being possibly secret.

As non-limiting example, said unit $UTM_A$ can be constituted by a material key on the USB bus of the system $STD_A$ or preferably by a chip card and its interface commonly called card reader linked up to the system $STD_A$.

In the case where the unit $UTM_A$ is constituted by a chip card and its interface, the transfer means $A_{30}$ are split into two parts, one being on the interface and the other one being on the chip card. In this embodiment, the absence of the chip card is considered as equivalent to the absence of the unit $UTM_A$, inasmuch as the processing and memorizing means $A_{31}$ contained in the chip card are missing.

The system 1 also includes a B-type data processing system $STD_B$. Generally speaking, such a B-type data processing system $STD_B$ includes at least one processor $B_{10}$ enabling the execution of an implementation software $B_{11}$. The B-type data processing system $STD_B$ can be a computer, a server or be part, for instance, of various machines, devices, fixed or mobile products, or vehicles in the general sense. The B-type data processing system $STD_B$ is connected, using transfer means $B_{12}$, by a link $B_{20}$, to a B-type processing and memorizing unit $UTM_B$.

For the sake of simplification in the rest of the description, the B-type data processing system $STD_B$ shall be referred to as system $STD_B$ and the B-type processing and memorizing unit $UTM_B$ shall be referred to as unit $UTM_B$.

The link $B_{20}$ between the system $STD_B$ and the unit $UTM_B$ can be realized in any possible way, such as for instance a serial link, a USB bus, a radio link, an optical link, a network link or a direct electric connection to a circuit of the system $STD_B$, etc. It should be observed that the unit $UTM_B$ can possibly be physically located inside the same integrated circuit than the processor of the system $STD_B$. In this case, the unit $UTM_B$ can be considered as a co-processor in relation to the processor of the system $STD_B$ and the link $B_{20}$ is internal to the integrated circuit.

The unit $UTM_B$ includes transfer means $B_{30}$ and processing and memorizing means $B_{31}$. It must be considered that the transfer means $B_{12}$ and $B_{30}$ are of software and/or hardware nature and are capable of providing and optimizing the data communication between the system $STD_B$ and the unit $UTM_B$. Said transfer means $B_{12}$, $B_{30}$ are adapted to enable to have at one's disposal an implementation software $B_{11}$ which is, preferably, independent from the type of link $B_{20}$ used. Said transfer means $B_{12}$, $B_{30}$ are not part of the subject of the invention and are not described more precisely as they are well known by the Man of art.

Said unit $UTM_B$ is able to:

using the transfer means $B_{30}$:
   accept data provided by the system $STD_B$,
   return data to the system $STD_B$, using the processing and memorizing means $B_{31}$:
   to store data possibly in secret and to retain at least a part of said data even if the unit $UTM_B$ is switched off,
   and to carry out algorithmic processing on data, part or all of said processing being possibly secret.

As non-limiting example, said unit $UTM_B$ can be constituted by a material key on the USB bus of the system $STD_B$ or preferably by a chip card and its interface commonly called card reader linked up to the system $STD_B$.

In the case where the unit $UTM_B$ is constituted by a chip card and its interface, the transfer means $B_{30}$ are split into two parts, one being on the interface and the other one being on the chip card. In this embodiment, the absence of the chip card is considered as equivalent to the absence of the unit $UTM_B$, inasmuch as the processing and memorizing means $B_{31}$ contained in the chip card are missing.

The system 1 according to the invention also includes at least once, at least one link L between the system $STD_A$ and the system $STD_B$. Said link L constitutes an information transfer channel and can be realized in all known ways. Said link L can be provided by a computer network and/or by a material transmission of information (personal delivery, postal delivery, etc.). Depending on the applications, the link L can transmit information from the system $STD_A$ to the system $STD_B$, from the system $STD_B$ to the system $STD_A$ or in both directions. As non-limiting example, the transfer by said link L between the system $STD_A$ and the system $STD_B$ can take the following heterogeneous channel: transmission of files from the system $STD_A$, then printing on a physical support, then transfer of said physical support, then keyboarding data on a computer, then lastly transfer through a computer network to the system $STD_B$.

Figure 2:
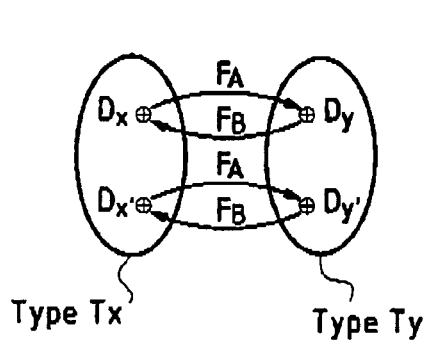
FIG. 2 is a diagram illustrating the transformations of data implemented by the subject of the invention.

FIG. 2 illustrates the data transformations carried out by the process according to the invention. Two data types are defined, namely the type $T_X$ and the type $T_Y$. Each of said types $T_X$ and $T_Y$ is a computer type of data, such as for instance, a 8-bit character, a 32-bit integer, a 64-bit integer, a 512-bit integer, a 64-bit float. In a preferred variant embodiment, the 64-bit integer type is used as data type $T_X$, as well as as data type $T_Y$.

The invention uses an A-type transformation function $F_A$ and a B-type transformation function $F_B$. The A-type transformation function $F_A$ is a bijection having as starting set the type $T_X$ and as ending set the type $T_Y$. The B-type transformation function $F_B$ is a bijection having as starting set the type $T_Y$ and as ending set the type $T_X$. The A-type transformation function $F_A$ and the B-type transformation function $F_B$ are inverse of each other. For the sake of simplification in the rest of the description, the A-type transformation function $F_A$ shall be referred to as function $F_A$ and the B-type transformation function $F_B$ shall be referred to as function $F_B$.

Thus, the function $F_A$ transforms a piece of $T_X$-type data $D_X$ into a piece of $T_Y$-type data $D_Y$, namely $D_Y = F_A(D_X)$, while the function $F_B$ transforms a piece of $T_Y$-type data $D_Y'$ into a piece of $T_X$-type data $D_X'$, namely $D_X' = F_B(D_Y')$.

Since the two functions $F_A$ and $F_B$ are inverse of each other:

by applying successively the two functions $F_A$, then $F_B$ to a piece of data $D_X$, one finds again the piece of data $D_X$, namely $D_X = F_B(F_A(D_X))$, by applying successively the two functions $F_B$, then $F_A$, to a piece of data $D_Y'$, one finds again the piece of data $D_Y'$, namely $D_Y' = F_A(F_B(D_Y'))$.

Figure 3:
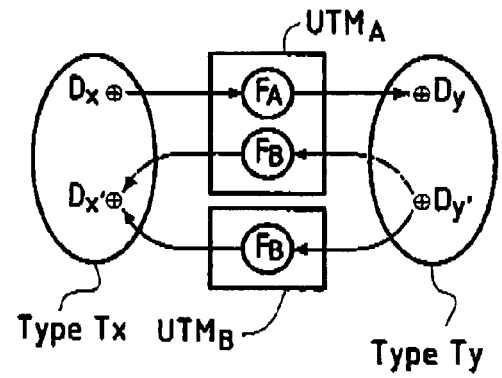
FIG. 3 is a diagram stowing the spot where the transformation functions are executed.

FIG. 3 illustrates the spot where the functions $F_A$ and $F_B$ are executed. So as to implement the invention, the functions $F_A$ and $F_B$ must remain confidential. To this end, the function $F_A$ is carried out only inside the unit $UTM_A$ and the function $F_B$ is carried out only inside the unit $UTM_B$ and, possibly, inside the unit $UTM_A$. Thus, in the unit $UTM_A$, a piece of $T_X$-type data $D_X$ is transformed by the function $F_A$ into a piece of $T_Y$-type data $D_Y$ and, possibly, a piece of $T_Y$-type data $D_Y'$ is transformed by the function $F_B$ into a piece of $T_X$-type data $D_X'$. Furthermore, in the unit $UTM_B$, a piece of $T_Y$-type data $D_Y'$ is transformed by the function $F_B$ into a piece of $T_X$-type data $D_X'$.

Figure 4:
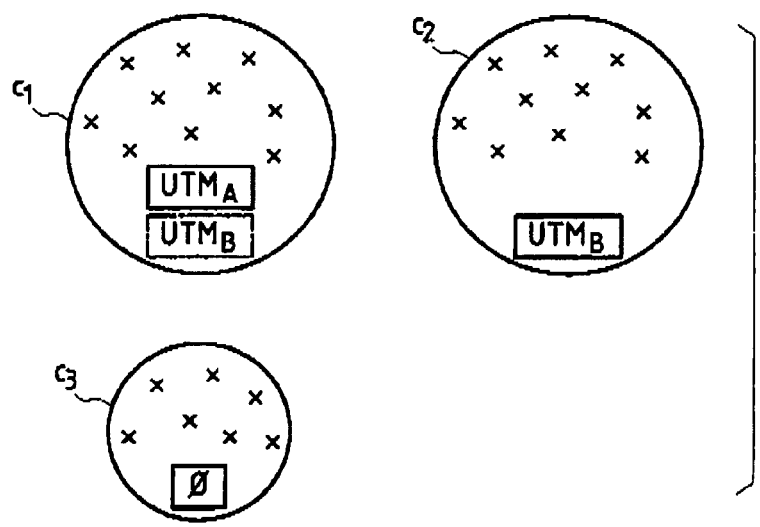
FIG. 4 is a diagram illustrating the user categories discriminated between by the subject of the invention.

FIG. 4 makes explicit the three categories of persons or users $C_1, C_2, C_3$ discriminated between by the subject of the invention, depending on the possession or not of the units $UTM_A$ and/or $UTM_B$.

Each user of the first category $C_1$ is able to transform a piece of $T_X$-type data into a piece of $T_Y$-type data using the function $F_A$ and, possibly to transform a piece of $T_Y$-type data into a piece of $T_X$-type data using the function $F_B$. Each user of the first category $C_1$ can thus use a unit $UTM_A$ and, possibly, a unit $UTM_B$.

Each user of the second category $C_2$ is able to transform a piece of $T_Y$-type data into a piece of $T_X$-type data using the function $F_B$. However, each user of the second category $C_2$ is not able to transform a piece of $T_X$-type data into a piece of $T_Y$-type data using the function $F_A$. Each user of the second category $C_2$ can use a unit $UTM_B$, but cannot use a unit $UTM_A$.

Each user of the third category $C_3$ possesses neither a unit $UTM_A$, nor a unit $UTM_B$. No user of said third category $C_3$ is able to transform a piece of $T_X$-type data into a piece of $T_Y$-type data using the function $F_A$, or to transform a piece of $T_Y$-type data into a piece of $T_X$-type data using the function $F_B$.

Naturally, the functions $F_A$ and $F_B$ are interesting only if they are not trivial and are difficult to infer from the observation of data coming in and out of the units $UTM_A$ and/or $UTM_B$.

Figure 5:
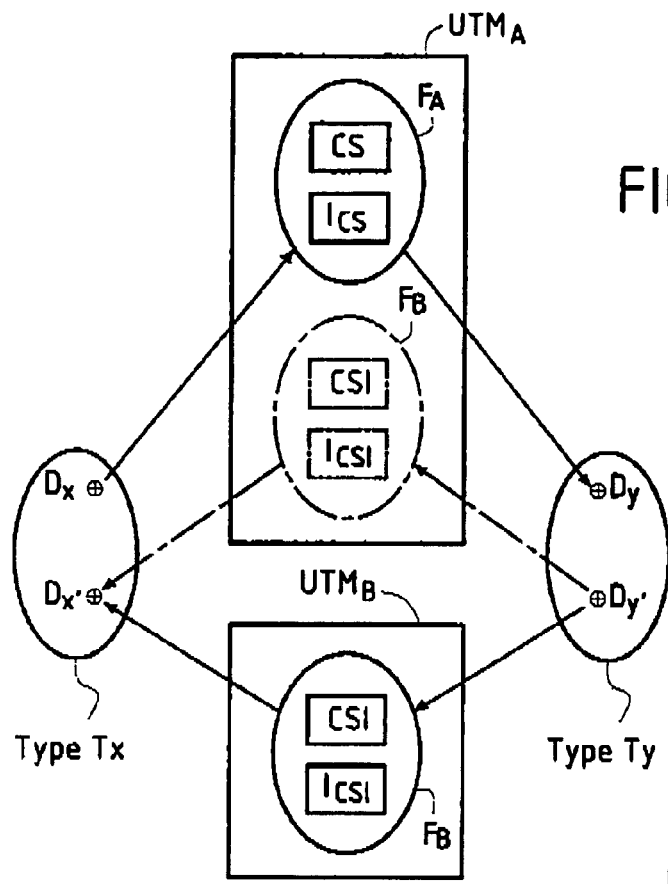
FIG. 5 is a diagram illustrating the carrying out of the transformation functions using the known technique of secret keys encryption.

FIG. 5 illustrates a first variant embodiment of the functions $F_A$ et $F_B$ using the known technique of secret keys encryption. According to this variant, the function $F_A$ is carried out in the form of a secret key encryption function CS using as secret key, a secret piece of information $I_{CS}$.

The secret key encryption function CS is a standard encryption function such as for instance DES, inverse DES, triple DES, or IDEA. The secret piece of information $I_{CS}$ is a key for the chosen encryption function. As such, the secret piece of information $I_{CS}$ belongs to the type $K_{CS}$, i.e. to the set of the keys for said function. For instance, said $K_{CS}$-type secret piece of information $I_{CS}$ is a 56-bit integer when the chosen secret key encryption function CS is DES.

In other words, the transformation of a piece of $T_X$-type data $D_X$ into a piece of $T_Y$-type data $D_Y$ using the function $F_A$ amounts to encrypt the piece of data $D_X$ using the secret key encryption function CS, using as secret key, the $K_{CS}$-type secret piece of information $I_{CS}$.

Similarly, the function $F_B$, inverse of the function $F_A$, is also carried out in the form of a secret key encryption function CSI, called inverse, using as secret key, a secret piece of information $I_{CSI}$.

The secret key inverse encryption function CSI is a standard encryption function such as for instance DES, inverse DES, triple DES, or IDEA.

The secret piece of information $I_{CSI}$ is a key for the chosen encryption function. As such, the secret piece of information $I_{CSI}$ belongs to the type $K_{CSI}$, i.e. to the set of the keys for said function.

In other words, the transformation of a piece of $T_Y$-type data $D_Y'$ into a piece of $T_X$-type data $D_X'$ using the function $F_B$ amounts to encrypt the piece of data $D_Y'$ using the secret key inverse encryption function CSI, using as secret key, the $K_{CSI}$-type secret piece of information $I_{CSI}$.

The secret key inverse encryption function CSI using the secret key $I_{CSI}$, is the inverse of the secret key encryption function CS using the secret key $I_{CS}$. For instance, in the case where the secret key encryption function CS is carded out by the function DES, the secret key inverse encryption function CSI must be carried out by the function inverse DES, while the $K_{CS}$-type secret piece of information $I_{CS}$ and the $K_{CSI}$-type secret piece of information $I_{CSI}$ must be identical.

Figure 6:
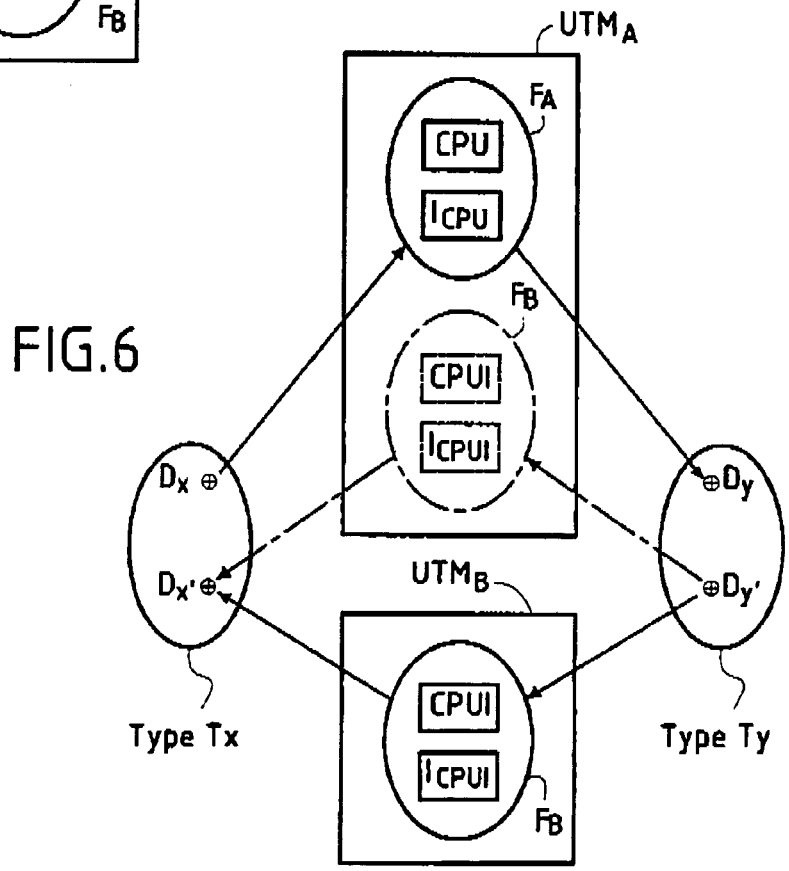
FIGS. 6 and 7 are diagrams illustrating two embodiments of the transformation functions using the known technique of public keys—private keys encryption.
Figure 7:
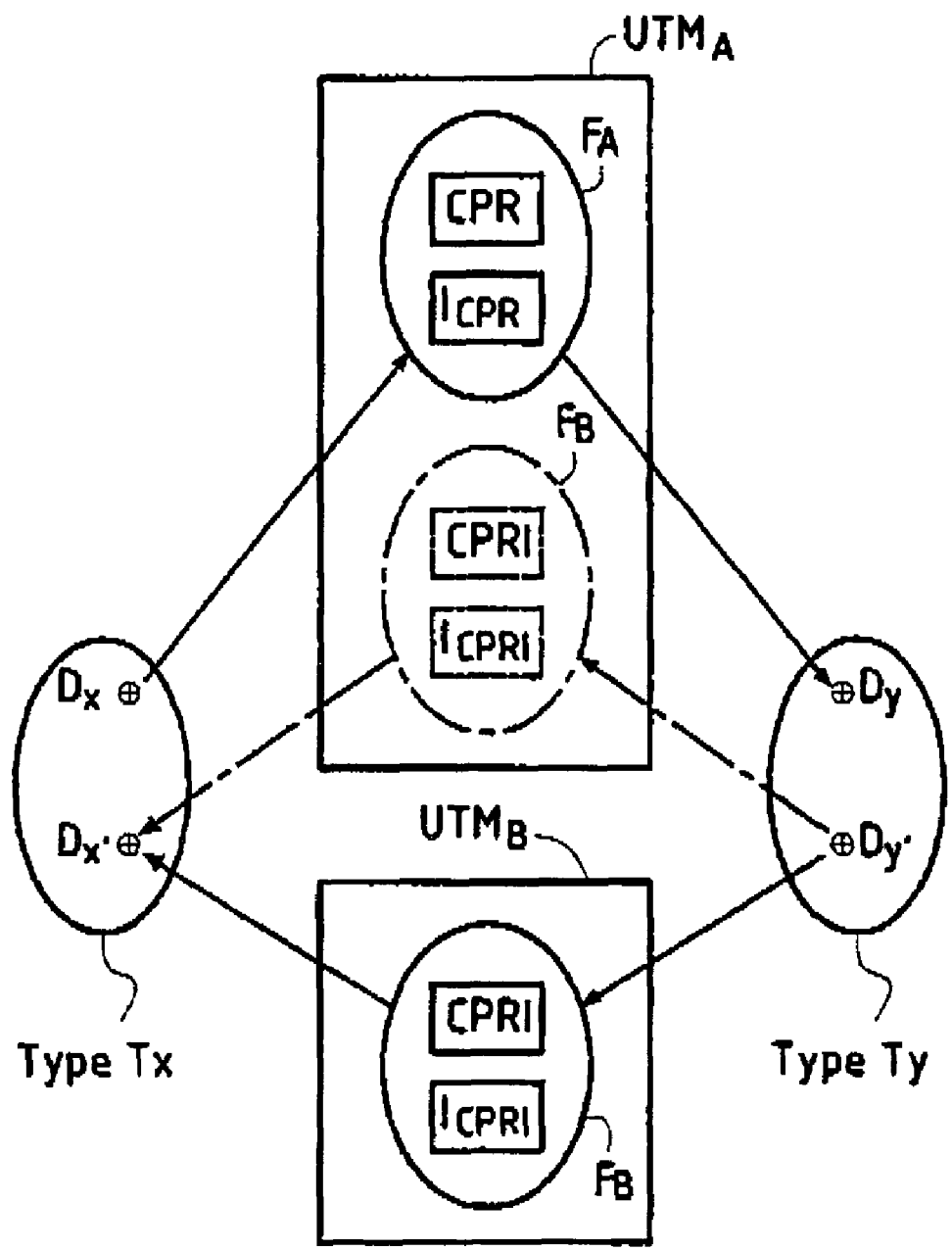

FIGS. 6 and 7 illustrate a second variant embodiment of the functions $F_A$ and $F_B$, using the known technique of public key-private key encryption.

FIG. 6 illustrates a first embodiment in which the function $F_A$ is carried out in the form of a public key encryption function CPU using as public key, a secret piece of information $I_{CPU}$.

The public key encryption function CPU is a standard encryption function, for instance RSA. The secret piece of information $I_{CPU}$ is a key for the chosen encryption function. As such, the secret piece of information $I_{CPU}$ belongs to the type $K_{CPU}$, i.e. to the set of the public keys for said function. For instance, said $K_{CPU}$-type secret piece of information $I_{CPU}$ can be formed by a "module" and a "public exponent" when the chosen public key encryption function CPU is RSA.

In other words, the transformation of a piece of $T_X$-type data $D_X$ into a piece of $T_Y$-type data $D_Y$ using the function $F_A$ amounts to encrypt the piece of data $D_X$ using the public key encryption function CPU, using as public key, the $K_{CPU}$-type secret piece of information $I_{CPU}$.

Similarly, the function $F_B$, inverse of the function $F_A$, is for its part carried out in the form of a private key decryption function CPUI, using as private key, a secret piece of information $I_{CPUI}$.

The private key decryption function CPUI is a standard function, for instance RSA.

The secret piece of information $I_{CPUI}$ is a key for the chosen decryption function. As such, the secret piece of information $I_{CPUI}$ belongs to the type $K_{CPUI}$, i.e. to the set of the private keys for said function.

In other words the transformation of a piece of $T_Y$-type data $D_Y'$ into a piece of $T_X$-type data $D_X'$ using the function $F_B$ amounts to decrypt the piece of data $D_Y'$ using the private key decryption function CPUI, using as private key, the $K_{CPUI}$-type secret piece of information $I_{CPUI}$.

The private key decryption function CPUI using the private key $I_{CPUI}$, is the inverse of the public key encryption function CPU using the public key $I_{CPU}$. For instance, in the case where the public key encryption function CPU is carried out by the RSA encryption function, the private key decryption function CPUI must be carried out by the RSA decryption function, while the $K_{CPU}$-type secret piece of information $I_{CPU}$ and the $K_{CPUI}$-type secret piece of information $I_{CPUI}$ must be respectively an RSA public key and its associated private key.

FIG. 7 illustrates a second embodiment in which the function $F_A$ is carried out in the form of a private key encryption function CPR using as private key, a secret piece of information $I_{CPR}$.

The private key encryption function CPR is a standard encryption function, for instance RSA. The secret piece of information $I_{CPR}$ is a key for the chosen encryption function. As such, the secret piece of information $I_{CPR}$ belongs to the type $K_{CPR}$, i.e. to the set of the private keys for said function. For instance, said $K_{CPR}$-type secret piece of information $I_{CPR}$ can be formed by a "module" and a "private exponent" when the chosen private key encryption function CPR is RSA.

In other words, the transformation of a piece of $T_X$-type data $D_X$ into a piece of $T_Y$-type data $D_Y$ using the function $F_A$ amounts to encrypt the piece of data $D_X$ using the private key encryption function CPR, using as private key, the $K_{CPR}$-type secret piece of information $I_{CPR}$.

Similarly, the function $F_B$, inverse of the function $F_A$, is for its part carried out in the form of a public key decryption function CPRI, using as public key, a secret piece of information $I_{CPRI}$.

The public key decryption function CPRI is a standard function, for instance RSA.

The secret piece of information $I_{CPRI}$ is a key for the chosen decryption function. As such, the secret piece of information $I_{CPRI}$ belongs to the type $K_{CPRI}$, i.e. to the set of the public keys for said function.

In other words, the transformation of a piece of $T_Y$-type data $D_Y'$ into a piece of $T_X$-type data $D_X'$ using the function $F_B$ amounts to decrypt the piece of data $D_Y'$ using the public key decryption function CPRI, using as public key, the $K_{CPRI}$-type secret piece of information $I_{CPRI}$.

The public key decryption function CPRI using the public key $I_{CPRI}$, is the inverse of the private key encryption function CPR using the private key $I_{CPR}$. For instance, in the case where the private key encryption function CPR is carried out by the RSA encryption function, the public key decryption function CPRI must be carried out by the RSA decryption function, while the $K_{CPR}$-type secret piece of information $I_{CPR}$ and the $K_{CPRI}$-type secret piece of information $I_{CPRI}$ must be respectively an RSA private key and its associated public key.

In the two examples described in relation to FIGS. 6 and 7, the terms "encryption function" and "decryption function" are used to refer to two encryption operations inverse of each other. For the sake of clarity, the first function is called encryption function and the second function is called decryption function. That choice is arbitrary, so much so that the first function might as well be called decryption function and the second function might as well be called encryption function.

Figure 8:
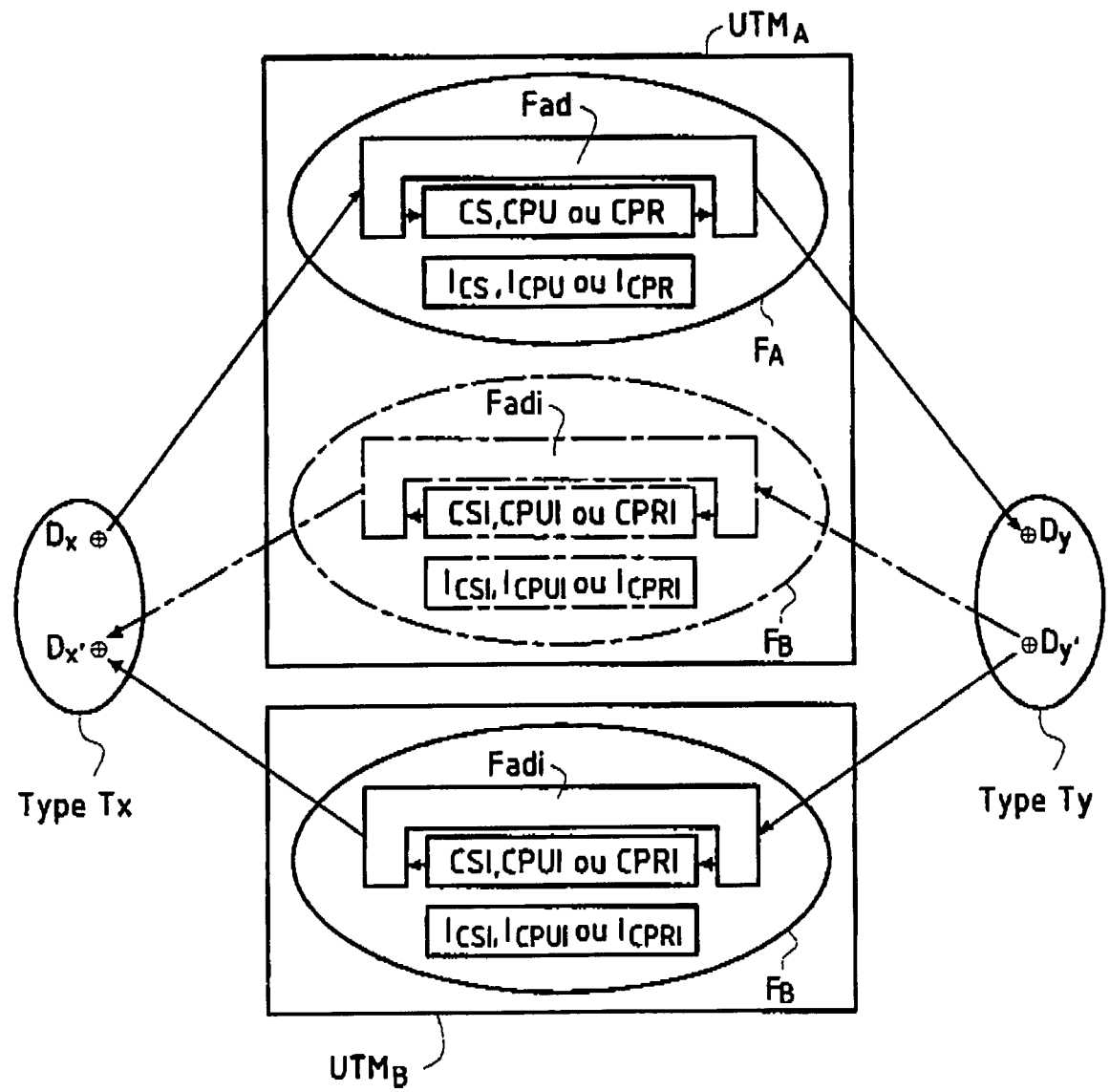
FIG. 8 is a diagram illustrating the implementation of an additional transformation function in addition to the known encryption functions.

FIG. 8 is a diagram illustrating the implementation of an additional transformation function in addition to the known encryption functions, as illustrated in FIGS. 5 to 7. Indeed, can be used as function $F_A$, an additional transformation function $F_{ad}$ combined with the secret key encryption function CS or with the public key encryption function CPU or with the private key encryption function CPR. Said additional transformation function $F_{ad}$ can be combined in any way before and/or after the secret key encryption function CS, the public key encryption function CPU or the private key encryption function CPR. Naturally, said additional transformation function $F_{ad}$ can also be formed by at least one encryption function.

Similarly, the function $F_B$ can be formed by an additional transformation function, called inverse $F_{adi}$, which is combined with the secret key inverse encryption function CSI or with the private key decryption function CPUI or with the public key decryption function CPRI.

Whichever embodiment of the transformation functions, illustrated in FIGS. 5 to 8, it must be considered that the subject of the invention includes, besides, a customization phase of the processing and memorizing units during which the transformation functions are implanted in the processing and memorizing units.

Figure 9:
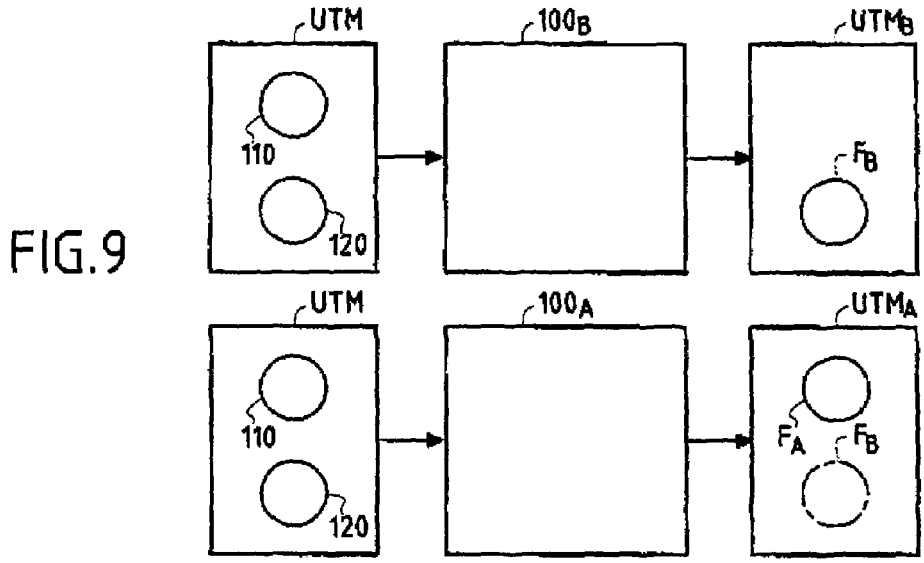
FIG. 9 is a diagram illustrating an implementation example of apparatuses of customization of processing and memorizing units.

FIG. 9 illustrates an implementation example of customization apparatuses $100_A$ and $100_B$ for processing and memorizing units UTM, with the intention of obtaining respectively, units $UTM_A$ and units $UTM_B$.

In a preferred embodiment, it must be considered that each processing and memorizing unit UTM includes algorithmic means 110 necessary to carry out the function $F_A$ and algorithmic means 120 necessary to carry out the function $F_B$. In the case where a secret key encryption function CS is used, the algorithmic means 110 correspond to means enabling, for instance, the carrying out of the DES function. In this case, the algorithmic means 120 correspond to means enabling the carrying out of the inverse DES function.

During a B-type customization phase, the customization apparatus $100_B$ carried out through a data processing system of any type, includes means to customize at least one processing and memorizing unit UTM, with the intention of obtaining a unit $UTM_B$. To that end, the algorithmic means 120 are used so as to obtain a unit $UTM_B$ which is able to carry out the function $F_B$. However, the customization apparatus $100_B$ must also:

either inhibit the algorithmic means 110 necessary to carry out the function $F_A$, or not load to the processing and memorizing unit UTM, the customization information enabling the carrying out of the function $F_A$, and possibly prevent its later loading.

Thus, a unit $UTM_B$ is obtained including the function $F_B$ and not including the function $F_A$.

Similarly, the customization apparatus $100_A$ carried out through a data processing system of any type, is used during an A-type customization phase, to customize at least one processing and memorizing unit UTM, with the intention of obtaining a unit $UTM_A$ including the function $F_A$ and, possibly, the function $F_B$. In the case where the unit $UTM_A$ does not include the function $F_B$, the algorithmic means 120 are inhibited or the customization information is not loaded, as explained above.

Naturally, the customization apparatuses $100_A$ and $100_B$ can be carried out through a same data processing system. Moreover, processing and memorizing units UTM including only the algorithmic means necessary to carry out only one of the two transformation functions can be used. In that case, it is obviously not necessary to inhibit the inverse function.

The customization apparatuses $100_A$ and $100_B$ are also used to provide the generation of secret information used by the functions $F_A$ and $F_B$ and, possibly, to provide the generation of additional parameters for the additional functions $F_{ad}$, $F_{adi}$ described in the examples illustrated in FIGS. 5 to 8.

Figure 10:
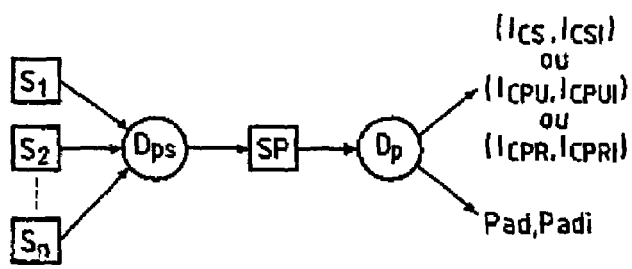
FIG. 10 is a diagram illustrating the principle of information generation.

FIG. 10 makes explicit the general principle of information generation. According to said figure, a principal secret SP is used by an algorithm $D_p$ enabling to determine one of the pairs of secret pieces of information $K_{CS}$-type $I_{CS}$ and $K_{CSI}$-type $I_{CSI}$, or $K_{CPU}$-type $I_{CPU}$ and $K_{CPUI}$-type $I_{CPUI}$, or $K_{CPR}$-type $I_{CPR}$ and $K_{CPRI}$-type $I_{CPRI}$ and, possibly, parameters $P_{ad}$ for the additional transformation function $F_{ad}$ and parameters $P_{adi}$ for the additional inverse transformation function $F_{adi}$.

To increase security, it can be advantageous that the principal secret SP may be determined from shared secrets $S_1, S_2, \ldots, S_n$, using a secret reconstruction algorithm $D_{ps}$.

Figure 11:
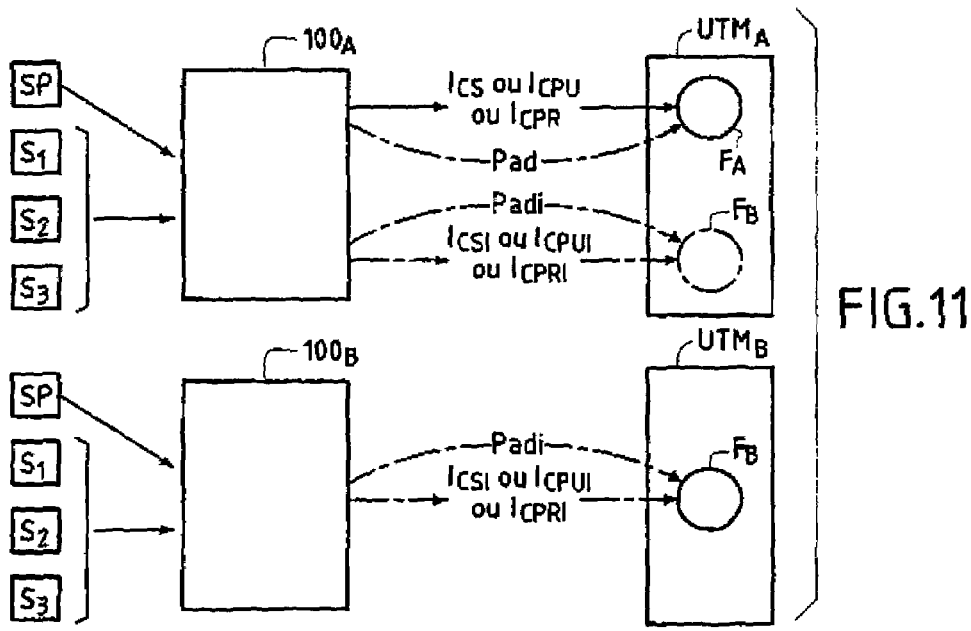
FIG. 11 is a diagram illustrating the generation and transfer of information towards the processing and memorizing units, during a customization phase.

After the generation of that information, it can be considered proceeding to the customization of the units $UTM_A$ and $UTM_B$. Thus, as it emerges more precisely from FIG. 11, during the A-type customization phase, the customization apparatus $100_A$ is used, to transfer to a processing and memorizing unit UTM, with the intention of obtaining a unit $UTM_A$:

the $K_{CS}$-type secret piece of information $I_{CS}$ or the $K_{CPU}$-type secret piece of information $I_{CPU}$ or the $K_{CPR}$-type secret piece of information $I_{CPR}$ and, possibly, the parameters $P_{ad}$ for the additional transformation function $F_{ad}$ to enable the unit $UTM_A$ to carry out the function $F_A$, and possibly, the $K_{CSI}$-type secret piece of information $I_{CSI}$ or the $K_{CPUI}$-type secret piece of information $I_{CPUI}$ or the $K_{CPRI}$-type secret piece of information $I_{CPRI}$ and, possibly the parameters $P_{adi}$ for the additional inverse transformation function $F_{adi}$ to enable the unit $UTM_A$ to carry out the function $F_B$.

Similarly, the customization apparatus $100_B$ is used during the B-type customization phase to transfer to a processing and memorizing unit UTM, with the intention of obtaining a unit $UTM_B$, the $K_{CSI}$-type secret piece of information $I_{CSI}$ or the $K_{CPUI}$-type secret piece of information $I_{CPUI}$ or the $K_{CPRI}$-type secret piece of information $I_{CPRI}$ and, possibly the parameters $P_{adi}$ for the additional inverse transformation function $F_{adi}$ to enable the unit $UTM_B$ to carry out the function $F_B$.

The subject of the invention aims at enabling to limit the possibility to transform $T_X$-type data into $T_Y$-type data and the possibility to transform $T_Y$-type data into $T_X$-type data. To that end, the subject of the invention aims at putting at the first user category $C_1$'s disposal, at least one unit $UTM_A$ to enable to transform a piece of $T_X$-type data into a piece of $T_Y$-type using a function $F_A$. Optionally, said unit $UTM_A$ includes the possibility to transform a piece of $T_Y$-type data into a piece of $T_X$-type data using the function $F_B$.

The second user category $C_2$ has at least one unit $UTM_B$ able to provide the transformation of $T_Y$-type data into $T_X$-type data using the function $F_B$. However, no user of said second category $C_2$ is able to carry out the transformation of $T_X$-type data into $T_Y$-type data using the function $F_A$. It thus appears possible to limit the possibility to transform data between tie users of different categories.

The subject of the invention is particularly useful in the case where the two user categories $C_1$ and $C_2$ able to transform data, do not have access to the secret information characterizing those transformations. Such a goal is reached by using processing and memorizing units, such as material keys on the USB bus or chip cards. The only possibility for a user of a category to carry out a transformation attributed to a user of the other category, is to obtain the unit belonging to the latter.

Figure 12:
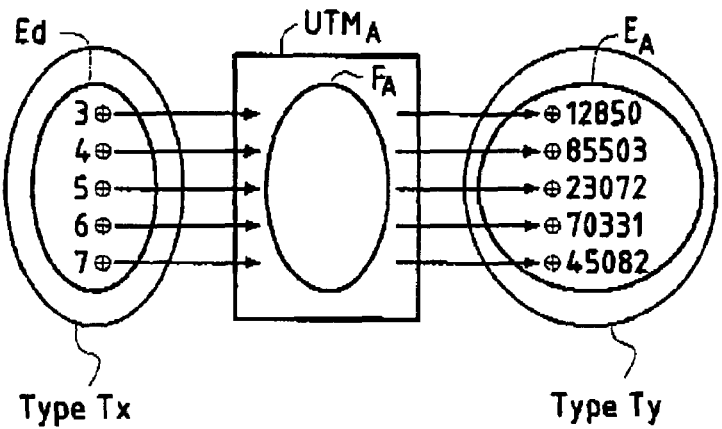
FIGS. 12 and 13 are respectively principle and application diagrams, illustrating an application example of the subject of the invention enabling the generation and use of prepayment tokens.
Figure 13:
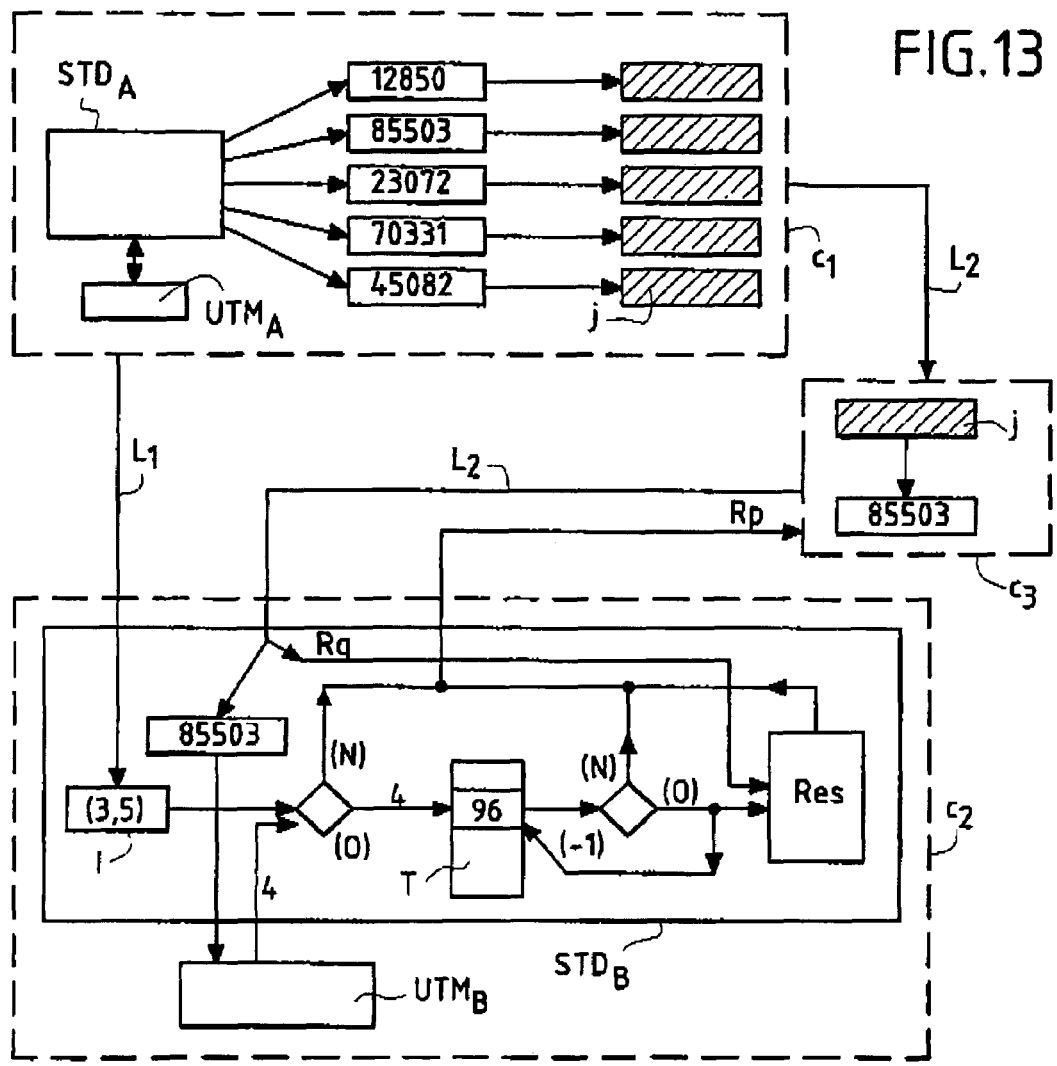

FIGS. 12 and 13 are respectively principle and application diagrams, illustrating an application example of the subject of the invention enabling the generation and use of data designed to constitute pre-payment tokens.

As it appears more precisely in FIG. 12, a starting set $E_D$ is defined, whose elements are pieces $T_X$-type data. The staring set $E_D$ includes, in the illustrated example, five elements, namely: 3, 4, 5, 6, 7. Each element of the starting set $E_D$ corresponds to an identifier of a client possessing a resource consumption credit, such as for instance a WEB pages viewing credit. During an A-type transformation phase, all the elements of the starting set $E_D$ are transformed using the function $F_A$ contained in the unit $UTM_A$, so as to obtain an ending set $E_A$ whose elements are pieces of $T_Y$-type data. In the illustrated example, the elements 3, 4, 5, 6, 7 are transformed respectively into 12850, 85503, 23072, 70331, 45082. The data thus obtained by the transformation carried out in the unit $UTM_A$ gives no indication on the elements of the starting set $E_D$.

As it appears more precisely in FIG. 13, each user belonging to the first category $C_1$, has a unit $UTM_A$ and can thus, from known initial identifiers, namely: 3, 4, 5, 6, 7 in the illustrated example, obtain pre-payment token identifiers, respectively 12580, 85503, 23072, 70331, 45082. Such prepayment token identifiers can, for instance, be printed on tokens j which can be constituted by any appropriate support, such as plastic cards or coupons. Said pre-payment token identifiers are, preferably, masked to attest to the non-use of the resource corresponding to said tokens.

Moreover, information I enabling to characterize the starting set $E_D$, is transmitted through a link $L_1$, to at least one system $STD_B$ belonging to a user of the second category $C_2$. In the present case where the staring set $E_D$ is composed of successive integers, the information I enabling to characterize the starting set $E_D$ can, for instance, be the value of the smallest element and the number of elements of the set, namely the pair (3, 5).

In the illustrated example, one of the tokens j is transmitted to a user of the third category $C_3$, who thus becomes a client possessing a resource consumption credit. That transmission is carried out by any appropriate mean, such as postal delivery or personal delivery (part of a link $L_2$). Remember that each user of said third category $C_3$ has neither a unit $UTM_A$, nor a unit $UTM_B$.

After having uncovered the identifier of his pre-payment token, namely 85503 in the illustrated example, the user of the third category $C_3$ transmits through another part of the link $L_2$ to a user of the second category $C_2$, the uncovered identifier, as well as a request $R_q$ for a resource $R_{es}$ to consume. Remember that each user of the second category $C_2$ has a unit $UTM_B$ linked up to a system $STD_B$. The identifier transmitted by the user of the third category $C_3$ to the system $STD_B$ is transferred to the unit $UTM_B$, so as to provide its transformation, using the function $F_B$ contained in the unit $UTM_B$, with the intention of restoring the initial identifier. In the illustrated example, the unit $UTM_B$ thus transfers to the system $STD_B$ the known initial identifier, namely 4, corresponding to the prepayment token 85503.

The system $STD_B$ uses the information I to verify that the transformed element, namely 4 in the illustrated example, belongs to the starting set $E_D$. That verification enables to make sure that the pre-payment token has not been tampered with or invented. Thus, if the identifier is not recognized (N), the request $R_q$ is refused, so much so that a negative reply $R_p$ is sent to the user of the third category $C_3$. If the request is accepted (O), the identifier is used as an index in an array T of resources. Said array T indicates the quantity of remaining credits (96 in the illustrated example) for the client possessing the pre-payment token corresponding to the identifier 4. It is then verified that the remaining credits are sufficient for the request made. In the negative case (N), a negative reply $R_p$ is sent to the user of the third category $C_3$. In the case where the credits are sufficient (O), the array is updated by subtracting the cost of the requested resource, and a positive reply $R_p$ containing the requested resource $R_{es}$ is prepared and then delivered to the user of the third category $C_3$.

In the previous example, note that:
a there are several links between the systems $STD_A$ and $STD_B$, called $L_1$, $L_2$,
the users of the first category $C_1$ correspond to persons able to issue pre-payment tokens,
the users of the second category $C_2$ correspond to a provider of services wishing to charge the access to resources $R_{es}$,
the users of the third category $C_3$ possessing at least one pre-payment token, corresponds to clients possibly accessing charged-for resources,
the users of the third category $C_3$ not possessing pre-payment tokens, cannot be clients and therefore cannot access charged-for resources.

In the preferred example described, the invention aims at limiting the possibility to transform data designed to constitute pre-payment tokens. Naturally, the subject of the invention can be implemented to limit the possibility to transform data of different kind, such as for instance, electronic mail messages, internet pages, etc.

The invention is not limited to the examples described and represented, as various modifications can be brought to it within its framework.

The invention claimed is:

1. Process to limit, through at least one processing and memorizing unit, the possibility to transform $T_X$-type data into $T_Y$-type data and the possibility to transform $T_Y$-type data into $T_X$-type data, the transformation of the $T_X$-type data into $T_Y$-type data being carried out using an A-type transformation function ($F_A$), while the transformation of the $T_Y$-type data into $T_X$-type data is carried out using a B-type transformation function ($F_B$), inverse of the A-type transformation function ($F_A$), the data being in particular designed to constitute for instance, pre-payment tokens, and being implemented on at least one data processing system, said process comprising:

using an A-type data processing system ($STD_A$) and a B-type data processing system ($STD_B$), setting up at least once, at least one link (L) between the A-type data processing system ($STD_A$) and the B-type data processing system ($STD_B$), so as to provide the transfer of at least $T_Y$-type data from the A-type data processing system ($STD_A$) to the B-type data processing system ($STD_B$) and/or to provide the transfer of at least $T_X$-type data from the B-type data processing system ($STD_B$) to the A-type data processing system ($STD_A$), during an A-type customization phase, creating at least one A-type processing and memorizing unit ($UTM_A$) including at least the A-type transformation function ($F_A$), during an A-type transformation phase:
for a user possessing at least one A-type processing and memorizing unit ($UTM_A$), enabling:
to transfer at least one piece of $T_X$-type data from the A-type data processing system ($STD_A$) to the A-type processing and memorizing unit ($UTM_A$),
to transform in the A-type processing and memorizing unit ($UTM_A$), each piece of $T_X$-type data into a piece of $T_Y$-type data, using the A-type transformation function ($F_A$),
to transfer each piece of $T_Y$-type data from the A-type processing and memorizing unit ($UTM_A$) to the A-type data processing system ($STD_A$), for a user not possessing any A-type processing and memorizing unit ($UTM_A$), not being able to transform a piece of $T_X$-type data into a piece of $T_Y$-type data, using the A-type transformation function ($F_A$), during a B-type customization phase, creating at least one B-type processing and memorizing unit ($UTM_B$) including the B-type transformation function ($F_B$) and not including the A-type transformation function ($F_A$), and during a B-type transformation phase:

for a user possessing a B-type processing and memorizing unit ($UTM_B$), and not possessing an A-type processing and memorizing unit ($UTM_A$), enabling:

to transfer at least one piece of $T_Y$-type data from the B-type data processing system ($STD_B$), to the B-type processing and memorizing unit ($UTM_B$), to transform in the B-type processing and memorizing unit ($UTM_B$), each piece of $T_Y$-type data into a piece of $T_X$-type data, using the B-type transformation function ($F_B$), to transfer each piece of $T_X$-type data from the B-type processing and memorizing unit ($UTM_B$) to the B-type data processing system ($STD_B$), not being able to transform a piece of $T_X$-type data into a piece of $T_Y$-type data using the A-type transformation function ($F_A$).

2. Process according to claim 1, comprising, during the A-type customization phase, creating an A-type processing and memorizing unit ($UTM_A$) also including the B-type transformation function ($F_B$) inverse of the A-type transformation function ($F_A$).

3. Process according to claim 1 or 2, comprising:

using in the A-type processing and memorizing unit ($UTM_A$) as A-type transformation function ($F_A$), a secret key encryption function (CS), as well as a $K_{CS}$-type secret piece of information ($I_{CS}$) used as secret key for said function, and using in the B-type processing and memorizing ($UTM_B$) and possibly in the A-type processing and memorizing unit ($UTM_A$), as B-type transformation function ($F_B$):

a secret key inverse encryption function (CSI), inverse of the secret key encryption function (CS), and a $K_{CSI}$-type secret piece of information ($I_{CSI}$) used as secret key for the secret key inverse encryption function (CSI).

4. Process according to claim 1 or 2, comprising:

using in the A-type processing and memorizing unit ($UTM_A$), as A-type transformation function ($F_A$), a public key encryption function (CPU), as well as a $K_{CPU}$-type secret piece of information ($I_{CPU}$) used as public key for said function, and using in the B-type processing and memorizing ($UTM_B$) and possibly in the A-type processing and memorizing unit ($UTM_A$), as B-type transformation function ($F_B$):

a private key description function (CPUI), inverse of the public key encryption function (CPU), and a $K_{CPUI}$-type secret piece of information ($I_{CPUI}$) used as private key for the private key decryption function (CPUI).

5. Process according to claim 1 or 2, comprising:

using in the A-type processing and memorizing unit ($UTM_A$), as A-type transformation function ($F_A$), a private key encryption function (CPR), as well as a $K_{CPR}$-type secret piece of information ($I_{CPR}$) used as private key for said function, and using in the B-type processing and memorizing ($UTM_B$) and possibly in the A-type processing and memorizing unit ($UTM_A$), as B-type transformation function ($F_B$):

a public key decryption function (CPRI), inverse of the private key encryption function (CPR), and a $K_{CPRI}$-type secret piece of information ($I_{CPRI}$) used as public key for the public key decryption function (CPRI).

6. Process according to claim 3, 4 or 5, comprising:

using as A-type transformation function ($F_A$), an additional transformation function ($F_{ad}$) combined with the secret key encryption function (CS), with the public key encryption function (CPU), or with the private key encryption function (CPR), and using as B-type transformation function ($F_B$), an additional inverse transformation function ($F_{adi}$) combined with the secret key inverse encryption function (CSI), with the private key decryption function (CPUI), or with the public key decryption function (CPRI).

7. Process according to one of the claims 1 to 5, comprising:

using as A-type processing and memorizing units ($UTM_A$) and/or B-type processing and memorizing units ($UTM_B$), processing and memorizing units (UTM) including each algorithmic means (110, 120) necessary to carry out the A-type transformation function ($F_A$) the B-type transformation function ($F_B$), inhibiting:

during the B-type customization phase, in each B-type processing and memorizing unit ($UTM_B$), the possibility to carry out the A-type transformation function ($F_A$), and possibly, during the A-type customization phase, in each A-type processing and memorizing unit ($UTM_A$), the possibility to carry out the B-type transformation function ($F_B$).

8. Process according to one of the claims 3, 4, 5 or 6, comprising generating a principal secret (SP) from which is determined a pair of secret pieces of information $K_{CS}$-type ($I_{CS}$) and $K_{CSI}$-type ($I_{CSI}$), or $K_{CPU}$-type ($I_{CPU}$) and $K_{CPUI}$-type ($I_{CPUI}$), or $K_{CPR}$-type ($I_{CPR}$) and $K_{CPRI}$-type ($I_{CPRI}$) and possibly parameters ($P_{ad}$) for the additional transformation function ($F_{ad}$) and parameters ($P_{adi}$) for the additional inverse transformation function ($F_{adi}$).

9. Process according to claim 8, comprising using a method of shared secrets ($S_1, S_2, \ldots, S_n$) to generate the principal secret (SP).

10. Process according to claim 8 or 9, comprising:

using the principal secret (SP) to generate at least one of the elements of the pairs of secret pieces of information $K_{CS}$-type ($I_{CS}$) and $K_{CSI}$-type ($I_{CSI}$), or $K_{CPU}$-type ($I_{CPU}$) and $K_{CPUI}$-type ($I_{CPUI}$), or $K_{CPR}$-type ($I_{CPR}$) and $K_{CPRI}$-type ($I_{CPRI}$), and possibly parameters ($P_{ad}$) for the additional transformation function ($F_{ad}$) and parameters ($P_{adi}$) for the additional inverse transformation function ($F_{adi}$), customizing during the A-type customization phase, each processing and memorizing unit ($UTM_A$) by transferring to it:

the $K_{CS}$-type secret piece of information ($I_{CS}$) or the $K_{CPU}$-type secret piece of information ($I_{CPU}$) or the $K_{CPR}$-type secret piece of information ($I_{CPR}$) and possibly the parameters ($P_{ad}$) for the additional transformation function ($F_{ad}$) to enable it to carry out the A-type transformation function ($F_A$), and possibly, the $K_{CSI}$-type secret piece of information ($I_{CSI}$) or the $K_{CPUI}$-type secret piece of information ($I_{CPUI}$) or the $K_{CPRI}$-type secret piece of information ($I_{CPRI}$) and, possibly the parameters ($P_{adi}$) for the additional inverse transformation function ($F_{adi}$) to enable it to carry out the B-type transformation function ($F_B$), customizing during the B-type customization phase, each B-type processing and memorizing unit ($UTM_B$) by transferring to it the $K_{CSI}$-type secret piece of information ($I_{CSI}$) or the $K_{CPUI}$-type secret piece of information ($I_{CPUI}$) or the $K_{CPRI}$-type secret piece of information ($I_{CPRI}$) and, possibly the parameters ($P_{adi}$) for the additional inverse transformation function ($F_{adi}$) to enable it to carry out the B-type transformation function ($F_B$).

11. Process according to claim 1, comprising:

during the A-type transformation phase:
defining a starting set ($E_D$) whose elements are pieces of $T_X$-type data,
transforming all the elements of the starting set ($E_D$) using the A-type transformation function ($F_A$) contained in the A-type processing and memorizing unit ($UTM_A$), so as to obtain an ending set ($E_A$) whose elements are pieces of $T_Y$-type data,
transferring from the A-type data processing system ($STD_A$) to the B-type data processing system ($STD_B$) through the link(s) (L):
information (I) enabling to characterize the starting set ($E_D$),
and at least one element of the ending set ($E_A$), and during the B-type transformation phase, for at least one element of the ending set ($E_A$) transferred from the A-type data processing system ($STD_A$) to the B-type data processing system ($STD_B$):
transforming it using the B-type transformation function ($F_B$) contained in the B-type processing and memorizing unit ($UTM_B$),
and verifying, using the information (I) enabling to characterize the starting set ($E_D$), that that transformed element corresponds to an element of the starting set ($E_D$).

12. Process according to claim 11, comprising using each element of the ending set ($E_A$) to constitute a prepayment token (j).

13. System to limit the possibility to transform $T_X$-type data into $T_Y$-type data and the possibility to transform $T_Y$-type data into $T_X$-type data, the transformation of the $T_X$-type data into $T_Y$-type data being carried out using an A-type transformation function ($F_A$), while the transformation of the $T_Y$-type data into $T_X$-type data is carried out using a B-type transformation function ($F_B$), inverse of the A-type transformation function ($F_A$), the data being in particular designed to constitute for instance pre-payment tokens, said system being characterized in that it includes:

at least one A-type data processing system ($STD_A$),
at least one B-type data processing system ($STD_B$),
at least one link (L), at least once, between the A-type data processing system ($STD_A$) and the B-type data processing system ($STD_B$), so as to provide the transfer of at least $T_Y$-type data from the A-type data processing system ($STD_A$) to the B-type data processing system ($STD_B$) and/or to provide the transfer of at least $T_X$-type data from the B-type data processing system ($STD_B$) to the A-type data processing system ($STD_A$), at least one A-type processing and memorizing unit ($UTM_A$) including at least the A-type transformation function ($F_A$), means to define at least one piece of $T_X$-type data designed to be transformed into a piece of $T_Y$-type data, means to transfer at least one piece of $T_X$-type data from the A-type data processing system ($STD_A$) to the A-type processing and memorizing unit ($UTM_A$), means to transform in the A-type processing and memorizing unit ($UTM_A$), each piece of $T_X$-type data into a piece of $T_Y$-type data, using the A-type transformation function ($F_A$), means to transfer each piece of $T_Y$-type data from the A-type processing and memorizing unit ($UTM_A$) to the A-type data processing system ($STD_A$), at least one B-type processing and memorizing unit ($UTM_B$) including the B-type transformation function ($F_B$) and not including the A-type transformation function ($F_A$), with the intention of not being able to transform a piece of $T_X$-type data into a piece of $T_Y$-type data using the A-type transformation function ($F_A$), means to define at least one piece of $T_Y$-type data designed to be transformed into a piece of $T_X$-type data, means to transfer at least one piece of $T_Y$-type data from the B-type data processing system ($STD_B$) to the B-type processing and memorizing unit ($UTM_B$), means to transform in the B-type processing and memorizing unit ($UTM_B$), each piece of $T_Y$-type data into a piece of $T_X$-type data, using the B-type transformation function ($F_B$), and means to transfer each piece of $T_X$-type data from the B-type processing and memorizing unit ($UTM_B$) to the B-type data processing system ($STD_B$).

14. System according to claim 13, characterized in that the A-type processing and memorizing unit ($UTM_A$) also includes the B-type transformation function ($F_B$) inverse of the A-type transformation function ($F_A$).

15. System according to claim 13 or 14, characterized in that:

the A-type processing and memorizing unit ($UTM_A$) includes as A-type transformation function ($F_A$), a secret key encryption function (CS), as well as a $K_{CS}$-type secret piece of information ($I_{CS}$) used as secret key for said function, and the B-type processing and memorizing unit ($UTM_A$) and possibly the A-type processing and memorizing unit ($UTM_A$), include(s) as B-type transformation function ($F_B$):
a secret key inverse encryption function (CSI), inverse of the secret key encryption function (CS),
and a $K_{CSI}$-type secret piece of information ($I_{CSI}$) used as secret key for the secret key inverse encryption function (CSI).

16. Apparatus to customize processing and memorizing units (UTM) used in a system in accordance with one of the claims 13 to 15, characterized in that it includes means to customize:

at least one A-type processing and memorizing unit ($UTM_A$) including the A-type transformation function ($F_A$) and possibly the B-type transformation function ($F_B$), and/or at least one B-type processing and memorizing unit (UTM$_B$) including the B-type transformation function (F$_B$) and not including the A-type transformation function (F$_A$).

17. Apparatus according to claim 16, characterized in that it includes, for processing and memorizing units (UTM) including each the possibility to carry out the A-type transformation function (F$_A$) and the B-type transformation function (F$_B$), inhibition means adapted to inhibit:

in each B-type processing and memorizing unit (UTM$_B$) the use of the A-type transformation function (F$_A$), and possibly in each A-type processing and memorizing unit (UTM$_A$), the use of the B-type transformation function (F$_B$).

* * * * *